US005765650A

United States Patent [19]
Checkel

[11] Patent Number: 5,765,650
[45] Date of Patent: Jun. 16, 1998

[54] HYDRAULIC POWER COUPLING FOR AGRICULTURAL EQUIPMENT

[75] Inventor: James L. Checkel, Kasson, Minn.

[73] Assignee: AG Designs, Incorporated, Rochester, Minn.

[21] Appl. No.: 753,948

[22] Filed: Dec. 3, 1996

[51] Int. Cl.⁶ ........................................................ F16D 3/84
[52] U.S. Cl. ............................ 172/681; 74/15.6; 464/176
[58] Field of Search .................................. 180/53.1, 53.3, 180/235, 271, 274, 279; 74/11, 13, 15.6, 608, 609; 464/176, 170; 280/420; 172/681, 682, 683; 56/DIG. 11, 11.9

[56] References Cited

U.S. PATENT DOCUMENTS

| | | |
|---|---|---|
| 3,507,347 | 4/1970 | Bennett . |
| 3,717,045 | 2/1973 | Burenga . |
| 3,738,028 | 6/1973 | Reinhardt ........................ 414/83.32 X |
| 3,797,211 | 3/1974 | Turner ........................ 56/15.6 |
| 4,008,583 | 2/1977 | Davis . |
| 4,149,732 | 4/1979 | Watkins, Jr. ........................ 280/56 |
| 4,308,931 | 1/1982 | Khanna . |
| 4,416,590 | 11/1983 | Colucci ........................ 417/231 |
| 4,553,950 | 11/1985 | Teich . |
| 4,665,768 | 5/1987 | Rashkovsky . |
| 4,761,152 | 8/1988 | Wagenbach, Jr. . |
| 5,311,961 | 5/1994 | Stabenow . |
| 5,364,310 | 11/1994 | Taylor . |

FOREIGN PATENT DOCUMENTS

| | | |
|---|---|---|
| 17751587 | 7/1992 | U.S.S.R. . |
| 1370013 | 10/1997 | United Kingdom . |

Primary Examiner—Terry Lee Melius
Assistant Examiner—Robert Pezzuto
Attorney, Agent, or Firm—Richard C. Litman

[57] ABSTRACT

A hydraulic power coupling assembly for coupling a tractor power take-off to various pieces of towed or stationary, powered agricultural equipment. The hydraulic assembly includes a hydraulic pump mounted on the tractor power take-off, a hydraulic motor mounted on a selected piece of agricultural equipment and quick-connect connectors among the pump, motor and the selected agricultural equipment. The pump includes its own reservoir for oil or hydraulic fluid. A shield is incorporated into the pump to eliminate the need for a tractor mounted shield. The hydraulic assembly can be readily removed and transferred to another piece of agricultural equipment to be powered. Thus, the hydraulic assembly is readily available for any powered agricultural equipment needs, while at the same time, removing the exposure to the hazardous area of a tractor's power take-off drive unit.

7 Claims, 3 Drawing Sheets

HYDRAULIC POWER COUPLING FOR AGRICULTURAL EQUIPMENT

BACKGROUND OF THE INVENTION

1. Field of the Invention

The present invention relates generally to a hydraulic power coupling for agricultural equipment. More specifically, the invention relates to a hydraulic power coupling assembly for coupling a tractor power take-off (PTO) to various pieces of towed or stationary powered agricultural equipment.

2. Description of the Prior Art

Tractors are usually provided with a power take-off so that the power of the tractor can be used to drive various towed or stationary agricultural equipments, such seed planters, lime spreaders and the like. The equipment is connected to the power take-off shaft of the tractor. There have been numerous instances where the user has sustained serious injuries with entanglements with the power take-off shaft. The prior art discloses various safety devices, such as shields for the power take-off, as exemplified by the following patent art.

U.S. Pat. No. 3,507,347, issued on Apr. 21, 1970 to Marvin D. Bennett, describes a vehicle with a pump for delivering building materials such as plaster and a remote controlled power take-off for selectively powering the pump or the vehicle wheels. U.S. Pat. No. 3,717,045, issued on Feb. 20, 1973 to Thomas I. Burenga, describes a centrifugal pump assembly driven from the power take-off shaft of a farm tractor. U.S. Pat. No. 4,008,583, issued on Feb. 22, 1977 to Lewis Kle Davis, describes a swingable shield assembly for a tractor power take-off. U.S. Pat. No. 4,308,931, issued on Jan. 5, 1982 to Jagdish C. Khanna, describes a guard for a drive shaft in a farm tractor. U.S. Pat. No. 4,553,950, issued on Nov. 19, 1985 to Christian M. Teich, describes a flip-up shield assembly for a tractor power take-off. U.S. Pat. No. 4,665,768, issued on May 19, 1987 to Alexander Rashkovsky, describes a power take-off shaft shield assembly. U.S. Pat. No. 4,761,152, issued on Aug. 2, 1988 to Gerald L. Wagenbach, Jr., describes a foldable power take-off shaft shield. U.S. Pat. No. 5,311,961, issued on May 17, 1994 to Eugene E. Stabenow, describes a safety system for automatically shutting off the power take-off of a tractor in an emergency. U.S. Pat. No. 5,364,310, issued on November, 1994 to William Taylor, describes an attachment of a guard located around a power-off shaft extending between a tractor and a towed or mounted accessory or implement. Soviet Union Patent Document No. 1,751,587, dated Jul. 30, 1992, describes a system for automatic disconnection of the transmission of torque in agricultural equipment and a selectively open and closed protective guard. United Kingdom Patent Document No. 1,370,013, dated Oct. 9, 1974, describes a safety guard for a power take-off assembly. None of the above patents broadly disclose a hydraulic power coupling assembly for use with various pieces of agricultural equipment being powered, as defined by the present invention. Further, the cited prior art does not disclose a hydraulic power coupling assembly which includes a hydraulic pump mounted on the tractor PTO, a hydraulic motor mounted on a selected piece of agricultural equipment and quick-connect connectors among the pump, motor and the selected agricultural equipment, as defined by the present invention.

None of the above inventions and patents, taken either singly or in combination, is seen to describe the instant invention as claimed.

SUMMARY OF THE INVENTION

The present invention relates to a hydraulic power coupling assembly for coupling a tractor PTO to various pieces of towed or stationary powered agricultural equipment. The hydraulic assembly includes a hydraulic pump mounted on the tractor PTO, a hydraulic motor mounted on a selected piece of agricultural equipment and quick-connect connectors among the pump, motor and the selected agricultural equipment. The pump includes its own reservoir for oil or hydraulic fluid. A shield is incorporated into the pump to eliminate the need for a tractor mounted shield. The hydraulic assembly can be readily removed and transferred to another piece of agricultural equipment to be powered. Thus, the hydraulic assembly is readily available for any powered agricultural equipment needs, while at the same time, removing the exposure to the hazardous area of a tractor's PTO drive unit.

Accordingly, it is a principal object of the invention to provide a hydraulic power coupling assembly for coupling a tractor PTO to various pieces of towed or stationary powered agricultural equipment.

It is another object of the invention to provide a hydraulic power assembly associated with a tractor PTO wherein the exposure to the hazardous area of the tractor's PTO drive unit has been substantially eliminated.

It is a further object of the invention to provide a hydraulic power assembly associated with a tractor wherein the need for shielding at the connecting points between the tractor PTO and the powered agricultural equipment is substantially eliminated.

It is a still further object of the invention to provide a hydraulic power coupling assembly associated with a tractor PTO wherein the need for universal joints is substantially eliminated.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

In its broadest aspect the present invention is a hydraulic power coupling for coupling a tractor PTO to various pieces of towed or stationary powered agricultural equipment. The hydraulic power coupling assembly includes a hydraulic pump mounted on the power take-off shaft of the tractor, a hydraulic motor mounted on a selected piece of agricultural equipment being powered, quickconnect hose couplings between the pump and the motor, and quickconnect connectors between the selected piece of towed or stationary agricultural equipment and the coupling assembly.

Figure 1:
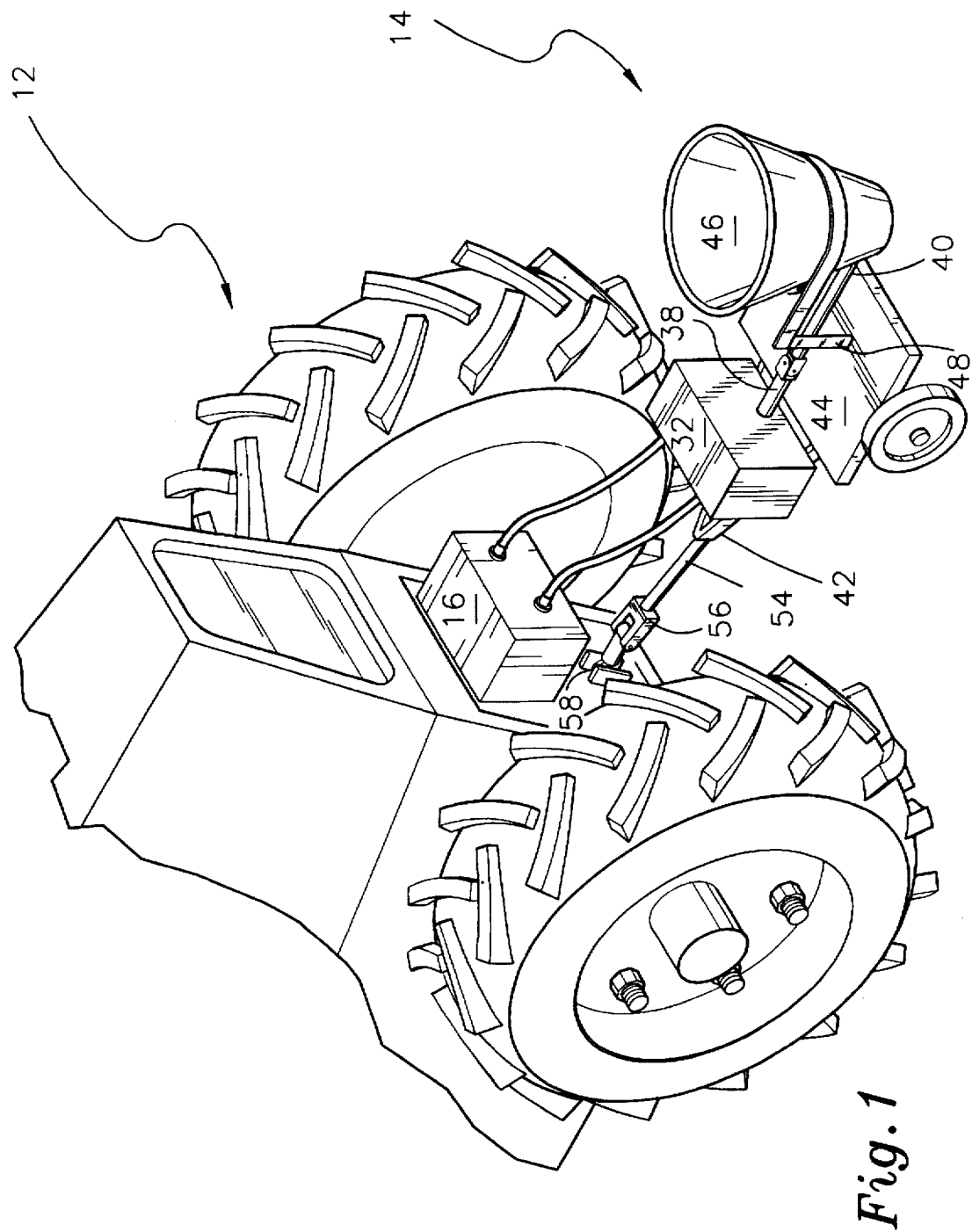
FIG. 1 is a perspective view of the hydraulic power coupling assembly associated with the tractor PTO for driving the towed or stationary agricultural equipment, in accordance with the present invention.
Figure 2:
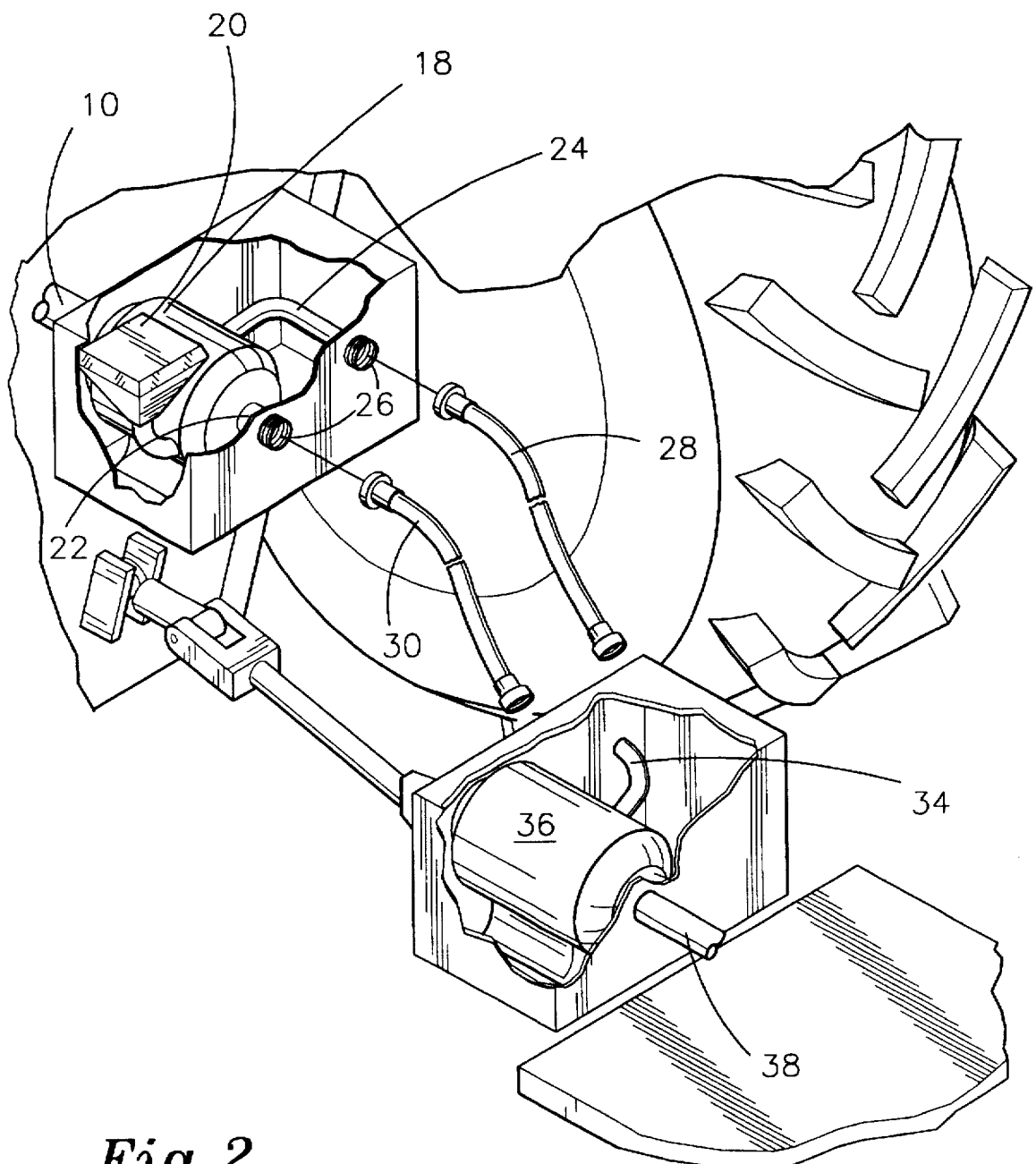
FIG. 2 is an enlarged view of the hydraulic assembly of FIG. 1, in detail.

With reference to FIGS. 1–2, there is illustrated a hydraulic power coupling assembly associated with a power take-off (PTO) shaft 10 of a tractor 12 for use with a particular piece of agricultural equipment which is powered for operative use. The example of an agricultural equipment that is disclosed for purposes of discussion is a wheeled spreader 14 for spreading a granular material and the like.

The hydraulic power coupling assembly includes a hydraulic pump housing 16 which is supported on the tractor 12 by suitable support means. A hydraulic pump 18 is mounted within the hydraulic pump housing 16 and is operatively connected with the PTO shaft 10 of the tractor 12. A hydraulic fluid reservoir 20 is mounted on the hydraulic pump 18. The hydraulic fluid reservoir 20 provides make-up fluid and deals with potential surges of the hydraulic pump 18. A conventional shield member (not shown) is incorporated within the hydraulic pump housing 16 thereby eliminating the need for a shield being directly associated with the PTO shaft 10 of the tractor 12. Also, the hydraulic pump housing 16 includes therein, a first inlet conduit 22 and a first outlet conduit 24. Each of the first inlet and outlet conduits 22, 24 is operatively respectively connected with the hydraulic pump 18 and includes a first quick-connect coupling member 26 mounted on the wall of the hydraulic pump housing 16. A hydraulic supply hose 28 is connected with the first hydraulic pump outlet conduit 24 via the respective first quick-connect coupling member 26. A hydraulic fluid return hose 30 is connected with the first inlet conduit 22 via the respective first quick-connect coupling member 26. A hydraulic motor housing 32 is supported by the towed spreader 14. The hydraulic motor housing 32 has a second inlet conduit 34 and a second outlet conduit (not shown). Each of the second inlet and outlet conduits respectively has second quick-connect coupling members (not shown) mounted on the hydraulic motor housing 32. The second quick-connect coupling members are similar to the first quick-connect coupling members 26. Each of the hydraulic supply and fluid return hose members 28, 30 respectively being of such length that each of the hose members can respectively be attached to the second quick-connect hose couplings on the hydraulic motor 32. A hydraulic motor 36 is mounted within the hydraulic motor housing 32 and is operatively connected via a rotating driven shaft 38 to a driven shaft 40 of the spreader 14. The rotating driven shaft 38 substantially duplicates the function of the PTO shaft 10. Thereby the rotating blades of the spreader 14 are powered by the PTO shaft 10 via the appropriate drive components of the hydraulic assembly.

Figure 3:
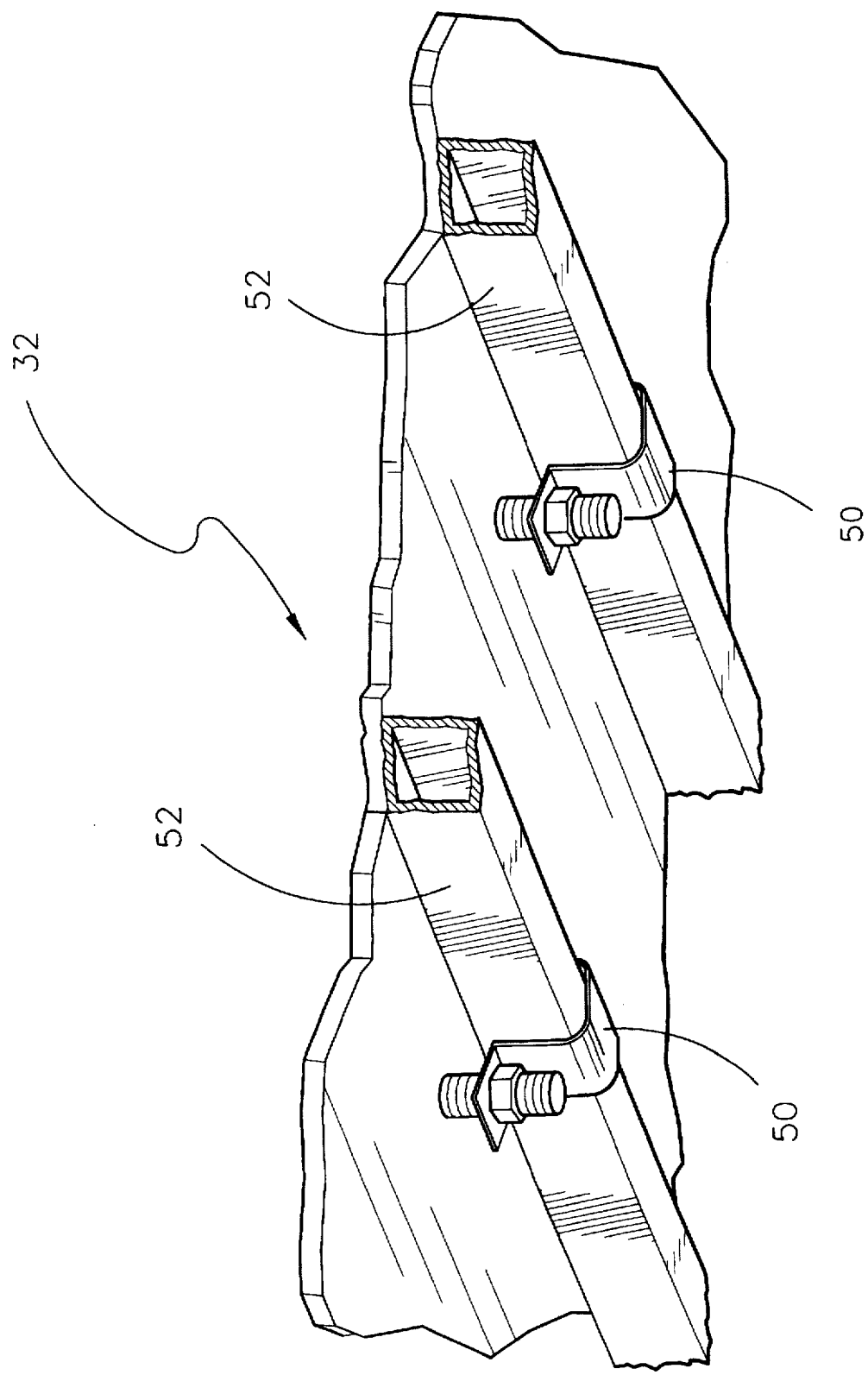
FIG. 3 is a perspective view of the brackets connecting the "A" frame beams to the bottom of the hydraulic motor housing, in accordance with the present invention.

The spreader 14 includes a supporting conventional A-shaped or "Al" frame 42, a base 44 mounted on the frame 42, a hopper 46 and a bracket 48 is mounted on the base 44 for holding the hopper 46 in an upright position. In FIG. 3, a pair of standard U-shaped brackets 50 bolts A-frame beams 52 to the bottom of the hydraulic motor housing 32. These types of bottom bracket fasteners provide a quick and easy structural arrangement of attaching the hydraulic assembly to any standard piece of towed or stationary agricultural equipment; that is, the user can purchase just one hydraulic power coupling assembly and use it on various pieces of towed or stationary agricultural equipment. The A-frame 42 is connected by a rod 54 which has a coupling 56 that attaches to a trailer hitch 58 of the tractor 12. Rotatable blades (not shown) are mounted in the hopper 46 for spreading the granular material from the hopper 46.

The blades are rotated by the spreader shaft 40 which is powered via the hydraulic motor shaft 38.

Thus, the hydraulic power coupling assembly can readily be removed when the tractor is not in use and can be transferred to the next piece of agricultural equipment to be powered. Accordingly, the invention is comprised by having the hydraulic power coupling assembly readily available for any powered agricultural equipment need while at the same time, removing the hazardous exposure to the PTO drive unit.

Various modifications may be made to the present invention. For example, a remote controlled device, such as a voice-controlled remote controlled device may be utilized in conjunction with the hydraulic power coupling assembly of the present invention.

It is to be understood that the present invention is not limited to the sole embodiment described above, but encompasses any and all embodiments within the scope of the following claims.

I claim:

1. A hydraulic power coupling assembly operatively connecting a power take-off shaft of a tractor with a rotating driven member of a selected piece of agricultural equipment having a frame, said hydraulic power coupling assembly comprising:

a hydraulic pump housing being supported on the tractor;

a hydraulic pump being mounted within said hydraulic pump housing and being operatively connected with the power take-off shaft of the tractor;

a hydraulic fluid reservoir being mounted within said hydraulic pump housing and on said hydraulic pump, said hydraulic fluid reservoir providing additional hydraulic fluid said hydraulic pump;

said hydraulic pump housing having a first inlet conduit and a first outlet conduit, said first inlet conduit and said first outlet conduit operatively connected with said hydraulic pump, and having respective first quick-connect coupling members mounted on said hydraulic pump housing;

a hydraulic supply hose member being removably connected with said first hydraulic pump outlet conduit via said respective first quick-connect coupling member;

a hydraulic fluid return hose member being removably connected with said hydraulic pump inlet conduit via said respective first quick-connect coupling member;

a hydraulic motor housing removably secured to said selected piece of agricultural equipment;

said hydraulic motor housing having a second inlet conduit and a second outlet conduit, said second inlet conduit and said second outlet conduit respectively having second quick-connect coupling members mounted on said hydraulic motor housing;

said hydraulic supply hose member and said hydraulic fluid return hose member being of such length to be removably attached to said second quick-connect hose coupling members on said hydraulic motor housing;

a hydraulic motor being mounted within said hydraulic motor housing and having a motor drive shaft, said motor drive shaft being operatively connected with the rotating driven member of the selected piece of agricultural equipment;

thereby the rotating driven member of the selected piece of agricultural equipment being powered by the power take-off shaft of the tractor via the hydraulic power coupling assembly.

2. The hydraulic power coupling assembly according to claim 1, further including:

bracket means associated with the frame of the selected piece of agricultural equipment for securing said hydraulic motor housing to the agricultural equipment.

3. The hydraulic power coupling assembly according to claim 2, wherein said bracket means are associated with an "A"-type frame of the selected piece of agricultural equipment.

4. The hydraulic power coupling assembly according to claim 1, in combination with said tractor having said power take-off shaft.

5. The combination of a tractor having a power take-off shaft and a selected piece of agricultural equipment having a rotating driven member and a frame, said tractor including:
 a hydraulic pump housing supported on the tractor;
 a hydraulic pump being mounted within said hydraulic pump housing and being operatively connected with the power take-off shaft of the tractor;
 a hydraulic fluid reservoir being mounted within said hydraulic pump housing and on said hydraulic pump, said hydraulic fluid reservoir providing additional hydraulic fluid said hydraulic pump;
 said hydraulic pump housing having a first inlet conduit and a first outlet conduit, said first inlet conduit and said first outlet conduit operatively connected with said hydraulic pump, and having respective first quick-connect coupling members mounted on said hydraulic pump housing;

said selected piece of agricultural equipment including:
 a hydraulic motor housing removably secured to said selected piece of agricultural equipment;
 a hydraulic motor being mounted within said hydraulic motor housing and having a motor drive shaft, said motor drive shaft being operatively connected with the rotating driven member of the selected piece of agricultural equipment;
 said hydraulic motor housing having a second inlet conduit and a second outlet conduit, said second inlet conduit and said second outlet conduit respectively having second quick-connect coupling members mounted on said hydraulic motor housing;

means for connecting said hydraulic pump housing to said hydraulic motor housing including:
 a hydraulic supply hose member being removably connected with said first hydraulic pump outlet conduit via said respective first quick-connect coupling member;
 a hydraulic fluid return hose member being removably connected with said hydraulic pump inlet conduit via said respective first quick-connect coupling member;
 said hydraulic supply hose member and said hydraulic fluid return hose member being of sufficient length to be removably attached to said second quick-connect hose coupling members on said hydraulic motor housing; and means for coupling said tractor to said selected piece of agricultural equipment.

6. The combination of claim 5 wherein said frame is an A-type frame and said hydraulic motor housing is removably secured to said frame by brackets.

7. The combination of claim 5 wherein said selected piece of agricultural equipment is a wheeled spreader.

* * * * *